(12) United States Patent
Bock (10) Patent No.: US 9,498,059 B1
(45) Date of Patent: Nov. 22, 2016

(54) UNIVERSAL ROD AND REEL RACK AND CARRIER

(71) Applicant: Ronald F Bock, St. Louis, MO (US)

(72) Inventor: Ronald F Bock, St. Louis, MO (US)

( * ) Notice: Subject to any disclaimer, the term of this patent is extended or adjusted under 35 U.S.C. 154(b) by 3 days.

(21) Appl. No.: 14/467,226

(22) Filed: Aug. 25, 2014

(51) Int. Cl.
*A47B 81/00* (2006.01)

(52) U.S. Cl.
CPC .................................. *A47B 81/005* (2013.01)

(58) Field of Classification Search
CPC .. A01K 97/08; A01K 97/10; Y10S 224/922; B60R 5/006; B60R 9/08; B60R 9/10; B60R 7/08; B60R 9/00; B60R 9/06; A47B 81/005
USPC ........... 211/64, 68, 70.8; 224/402, 403, 404, 224/405; 43/21.2
See application file for complete search history.

(56) References Cited

U.S. PATENT DOCUMENTS

| | | | | |
|---|---|---|---|---|
| 2,251,271 A | * | 8/1941 | Del Campo, Jr. ... | A47B 81/005 211/64 |
| 2,854,147 A | | 9/1958 | Derr | |
| 2,973,125 A | | 2/1961 | Parry | |
| 3,004,673 A | * | 10/1961 | Emery ................... | A47F 7/0028 211/70.8 |
| 3,146,889 A | * | 9/1964 | Franco ................... | A63D 15/10 211/68 |
| 4,181,221 A | * | 1/1980 | Tennant ................ | A47B 81/005 206/317 |
| 4,461,385 A | * | 7/1984 | Clouser ................. | A47B 81/005 211/4 |
| 4,479,322 A | * | 10/1984 | Koppel .................. | A01K 97/10 248/513 |
| 4,529,112 A | | 7/1985 | Miller | |
| 4,696,122 A | | 9/1987 | Van Der Zyl | |
| 4,779,914 A | | 10/1988 | Friedline | |
| 4,953,318 A | | 9/1990 | Vasseur | |
| 5,071,048 A | | 12/1991 | Price | |
| 5,632,427 A | * | 5/1997 | Gattuso ................. | A01K 97/10 211/70.8 |
| 5,657,883 A | * | 8/1997 | Badia .................... | A47B 81/005 211/60.1 |
| 5,664,721 A | | 9/1997 | Homeyer | |
| 5,678,700 A | * | 10/1997 | Crosson, Jr. .......... | A47B 81/005 211/60.1 |
| 5,803,519 A | * | 9/1998 | Daigle ................... | A01K 97/08 211/70.8 |
| 5,975,393 A | | 11/1999 | Bellamy | |
| 6,109,459 A | * | 8/2000 | Downey ................ | A01K 97/08 211/70.8 |
| 6,250,480 B1 | * | 6/2001 | McGuinness ........ | A47B 81/005 211/70.6 |
| 6,267,425 B1 | | 7/2001 | Dorsey | |
| 6,360,902 B1 | * | 3/2002 | Searles ................. | A47B 81/005 211/70.8 |
| 6,983,560 B2 | | 1/2006 | Williams | |
| 7,219,464 B1 | * | 5/2007 | Kujawa ................. | A01K 97/08 211/70.8 |
| 7,937,883 B2 | | 5/2011 | Roemer | |
| 8,746,469 B1 | * | 6/2014 | De La Torre ......... | A01K 97/08 211/70.8 |
| 8,947,201 B2 | * | 2/2015 | Crigger ................ | G07C 9/00158 211/4 |
| 2003/0051388 A1 | | 3/2003 | Barnes | |
| 2013/0015151 A1 | | 1/2013 | Wolfbauer | |
| 2015/0060378 A1 | * | 3/2015 | Bestor ................... | A47B 81/005 211/70.8 |

* cited by examiner

*Primary Examiner* — Patrick Hawn
(74) *Attorney, Agent, or Firm* — CreatiVenture Law; Linda L Lewis (57) ABSTRACT

A rack for storing and carrying at least one rod and reel, having at least two parallel side supports and a top crossbar and a bottom crossbar attached fixedly to the two parallel side supports, wherein the side supports have offsets which place the back surface of the bottom crossbar forward from about 0.25 to 2.0 inches from the front planar surface of the top crossbar; wherein the back planar surface of the bottom crossbar releasably engages with the handle of the rod and/or reel, and wherein the front planar surface of the top crossbar releasably engages with the rod.

19 Claims, 9 Drawing Sheets

UNIVERSAL ROD AND REEL RACK AND CARRIER

CROSS-REFERENCE TO RELATED APPLICATIONS

This application is a first filing on the invention.

STATEMENT REGARDING FEDERALLY SPONSORED RESEARCH

Not Applicable.

APPENDIX

Not Applicable.

BACKGROUND OF THE INVENTION

Field of the Invention

The present invention relates to fishing equipment, and more specifically relates to a device for storing and carrying rod and reel devices or fishing poles of a variety of shapes and styles.

Related Art

Carrying and storage racks for rod and reel devices are well known in the art. Many devices, such as are disclosed in U.S. Pat. Nos. 4,696,122, 4,779,914, 5,632,427, D508,771, and published application 2013/0015151 have a frame with the rod and reel fastened releasably to one side of the frame. This can create a situation where the rod can be unintentionally released if accidently bumped. Other devices have a frame or case where there are holes or openings through which the rod is threaded to secure to be carried. Such devices are disclosed in U.S. Pat. Nos. 2,854,147, 4,953,318, 5,803,519, 6,267,425, 7,937,883, D351,498, and published application 2003/0051388. The size of the openings can limit the type and size of the rod and reel that can be carried. If the opening is too large, the rods can bounce around and become damaged. Additionally, threading the rod through openings can be challenging if there are lines, lures and hooks attached.

The present invention securely attaches rods and reels of any size or design. There are no holes to thread the rod through to attach to the frame. Additionally, the present design avoids the problem of fastening the rod to only the front side of the frame, thus preventing the rod and reel from being easily and unintentionally released.

The present invention can be used as a carrier, wherein there is a carrier strap that can be looped over the shoulder, transporting the rod or rods vertically. This provides hands-free transportation of the rods, allowing the user to carry additional supplies, such as a tool box or a cooler. Alternatively, the present invention can be grasped on the side and the rods transported horizontally.

SUMMARY OF THE INVENTION

A rack for storing and carrying at least one rod and reel, comprising at least two parallel side supports and a top crossbar and a bottom crossbar attached fixedly to the two parallel side supports, wherein the rack has a front and a back, wherein the top crossbar has a front planar surface, wherein the bottom crossbar has a back planar surface, and wherein the side supports have offsets which place the back surface of the bottom crossbar forward from about 0.25 to 2.0 inches from the front planar surface of the top crossbar; wherein the back planar surface of the bottom crossbar releasably engages with the handle of the rod and/or reel, and wherein the front planar surface of the top crossbar releasably engages with the rod.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings. The drawings constitute a part of this specification and include exemplary embodiments of the invention, which may be embodied in various forms. It is to be understood that in some instances, various aspects of the invention may be shown exaggerated or enlarged to facilitate an understanding of the invention; therefore the drawings are not necessarily to scale. In addition, in the embodiments depicted herein, like reference numerals in the various drawings refer to identical or near identical structural elements.

DETAILED DESCRIPTION OF THE PREFERRED EMBODIMENTS

The following description of the preferred embodiment(s) is merely exemplary in nature and is in no way intended to limit the invention, its application, or uses.

Figure 1:
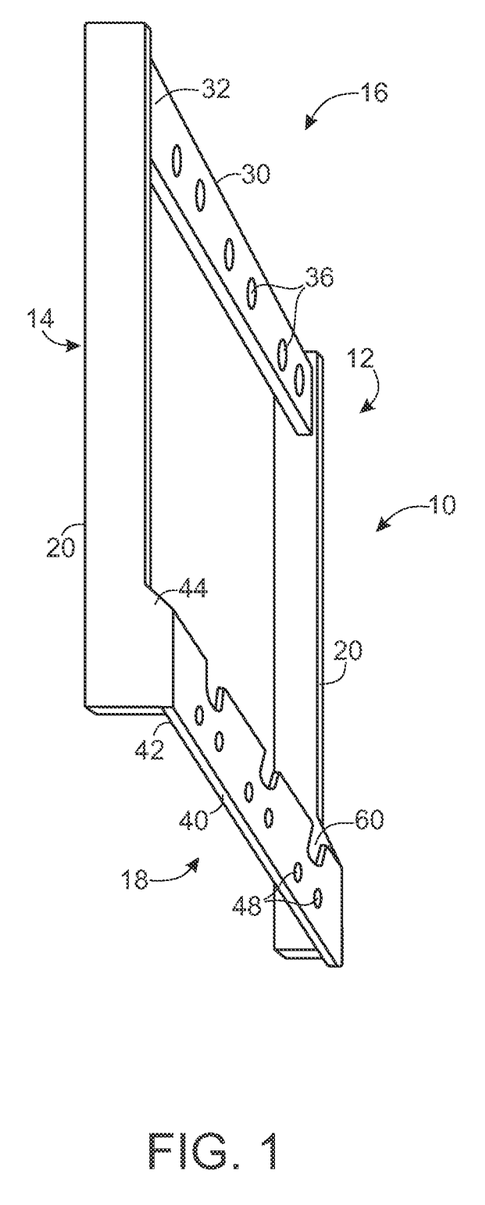
FIG. 1 is a side raised perspective of an embodiment of the invention.

The storage and carrying rack 10 of the present invention is shown in FIGS. 1 through 10. In FIG. 1 is shown the rack 10 with two parallel side supports 20, a top crossbar 30 and a bottom cross bar 40. The dimensions of the rack can vary, depending on the number of rod and reel devices it is designed to carry. For a rack 10 designed to carry three rod and reel devices, the typical dimensions are about 11 inches long for crossbars and about 15 to 18 inches long for the side supports. For a rack designed for five rod and reel devices, the crossbars can be about 17 inches long. Typically, the side supports are from about 10 to 20 inches long, and the cross bars are from about 10 to 20 inches long. The width of the side supports can vary from about ¼ inch to 3 inches. In a preferred embodiment, the width of the mounted rod's hand and/or finger guard is less than the width of the side support, so that the rack can be set on a surface horizontally and no part of the mounted rod touches the surface. The width of the top crossbar is typically less than the width of the bottom crossbar. The width for either crossbar can be from about ¼ to 3 three inches. The frame can be made out of any material that is rigid and strong enough to carry the rod and reel. Preferably, the frame is made out of wood or hard plastic, such as high density polyethylene, poly propylene or a copolymer that is rigid, strong and resistant to corrosion. Alternatively, the frame can be made out of polyvinyl chloride or metal such as aluminum. In a preferred embodiment, the frame is an injection molded polymer. In another preferred embodiment, the frame is made out of plywood, from ¼ to ¾ inches thick. In a more preferred embodiment, the frame is made out of ⅜ to ½ inch plywood with a water-resistant coating.

Figure 2:
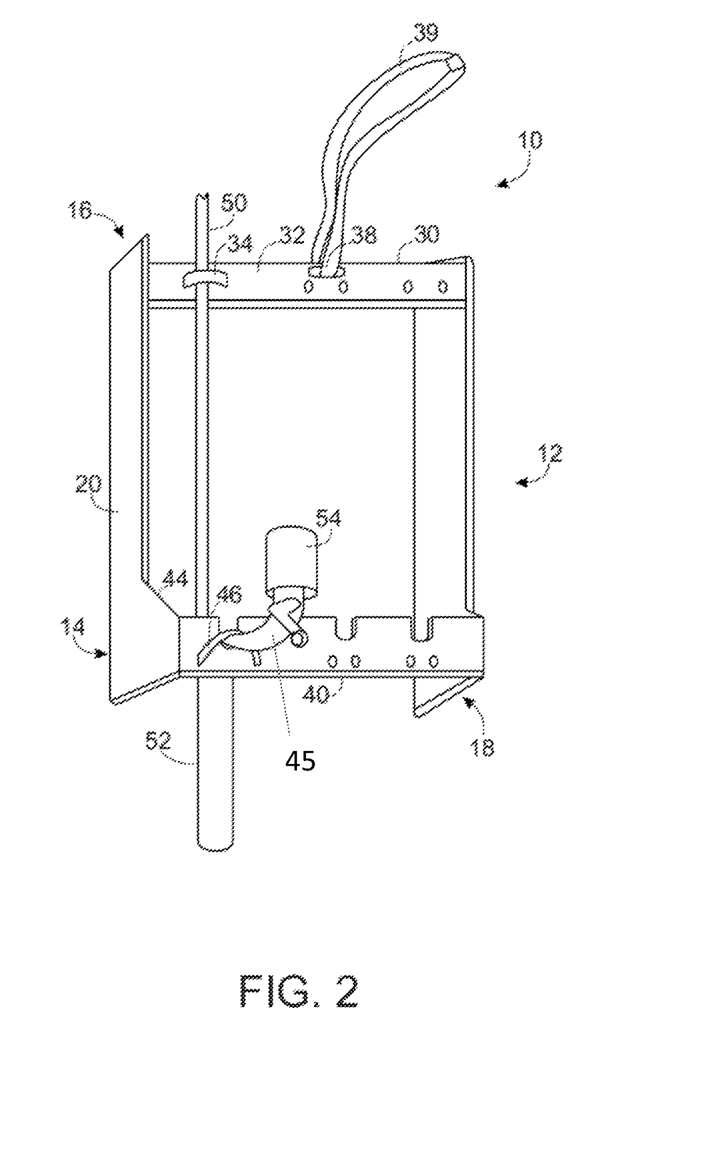
FIG. 2 is a front raised perspective of an embodiment of the invention.
Figure 3:
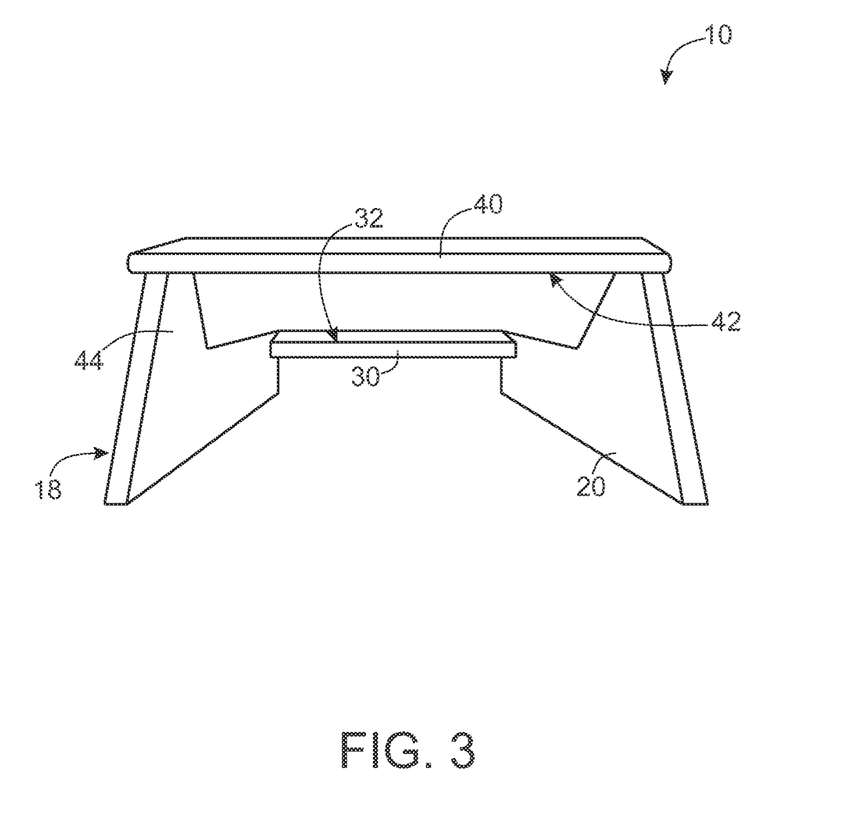
FIG. 3 is a bottom perspective of an embodiment of the invention.
Figure 4:
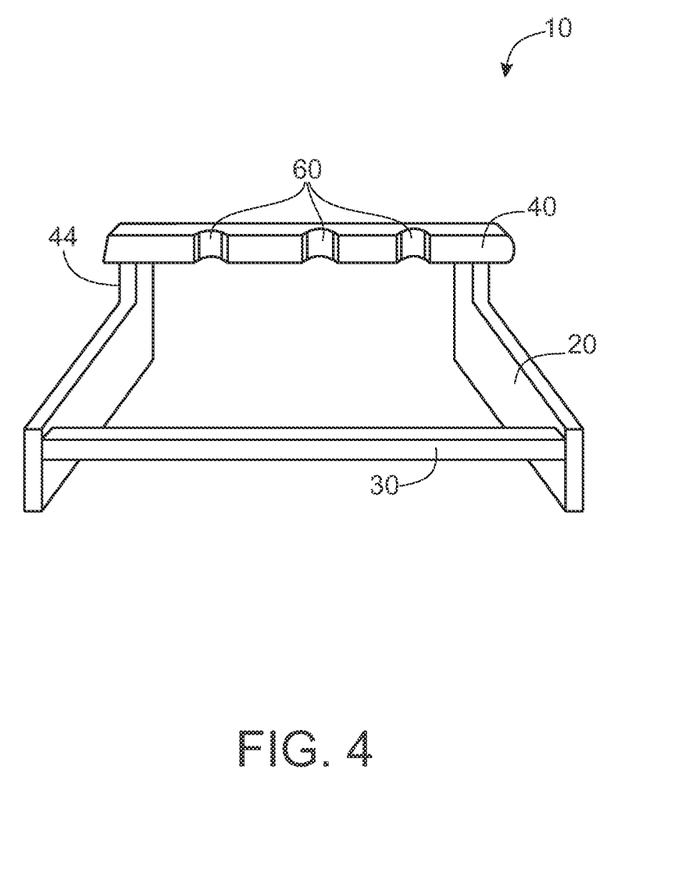
FIG. 4 is top raised perspective of an embodiment of the invention.
Figure 9:
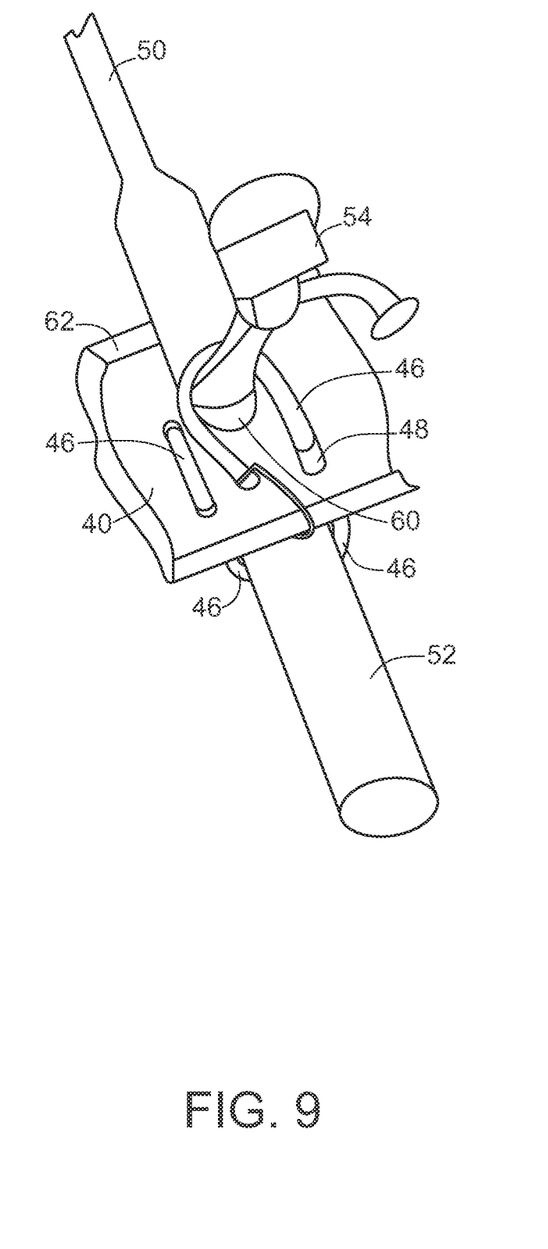
FIG. 9 is a back raised perspective of an embodiment of the invention.
Figure 10:
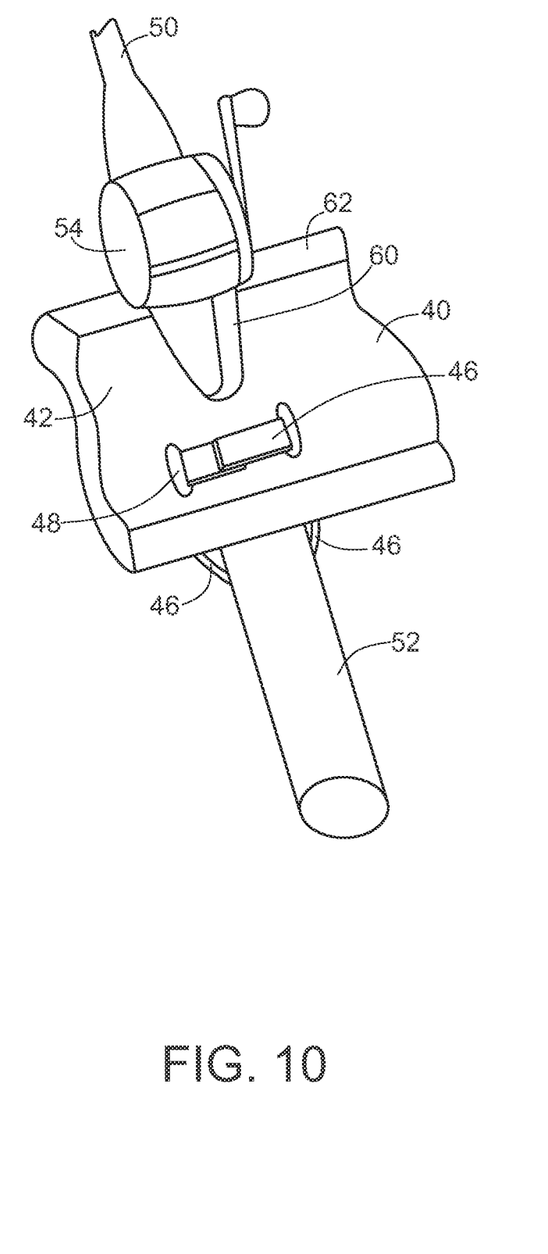
FIG. 10 is a back raised perspective of an embodiment of the invention.

The rack 10 has a front 12 and a back 14, and a top 16 and a bottom 18. The top crossbar 30 has a front surface 32 that is preferably planar and on that surface is a releasable fastener 34. The bottom crossbar 40 has a back surface 42 and a front surface 43 that are preferably planar and on the back surface 42 is a releasable fastener 46. The side supports 20 have offsets 44 that place the bottom crossbar 40 forward from the top crossbar 30 about ½ to 2 inches. In a preferred embodiment, the offset has a bevel 70. The releasable fasteners 34 and 46 can be any type of fastener that can be adjusted to attach rods and reels of varying sizes and shapes. Preferably the releasable fastener is a hook and loop fastener that can be threaded through top openings 36 on the top crossbar 30 and bottom openings 48 on the bottom crossbar 40. Typically these openings are pairs of openings that allow the releasable fastener to be threaded through and looped around the rod as shown in FIGS. 2 and 10. The openings are sized to allow the fastener to easily pass through, but not to easily fall out. In a preferred embodiment, the fastener 34 to the top crossbar can be attached to the back for easier handling. The width of the fastener is from about ¼ inch to about 1 inch. Alternatively, as shown in FIG. 9, the fastener can be a small elastic cord with hooks on either end, e.g., a small bungee cord, or other elastic or inelastic fastener. In a preferred embodiment, the bungee cord is threaded through three holes and hooked on the bottom crossbar 40. Loops are formed that securely fasten the handle of the fishing rod to the back surface 42 of the bottom crossbar 40.

As shown in FIG. 2, the rod 50 attaches releasably to the front surface 32 of the top crossbar 30, and handle 52 attaches to the back surface 42 of the bottom crossbar 40. The top fastener 34 holds the rod 50 firmly against the front surface 32 of the top crossbar 30. The bottom fastener 46 loops over the support arm 45 of the reel 54 and the handle 52 of the rod so that the handle 52 is pressed firmly against the back surface 42 of the bottom crossbar 40. The rod and reel device is removed by opening the fasteners and removing the device.

Figure 5A:
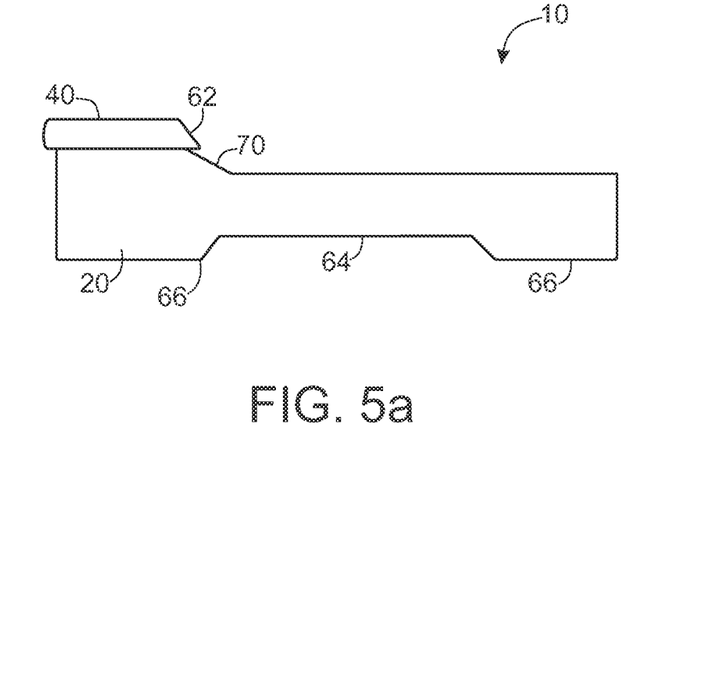
FIG. 5a is a side perspective of an embodiment of the invention.
Figure 5B:
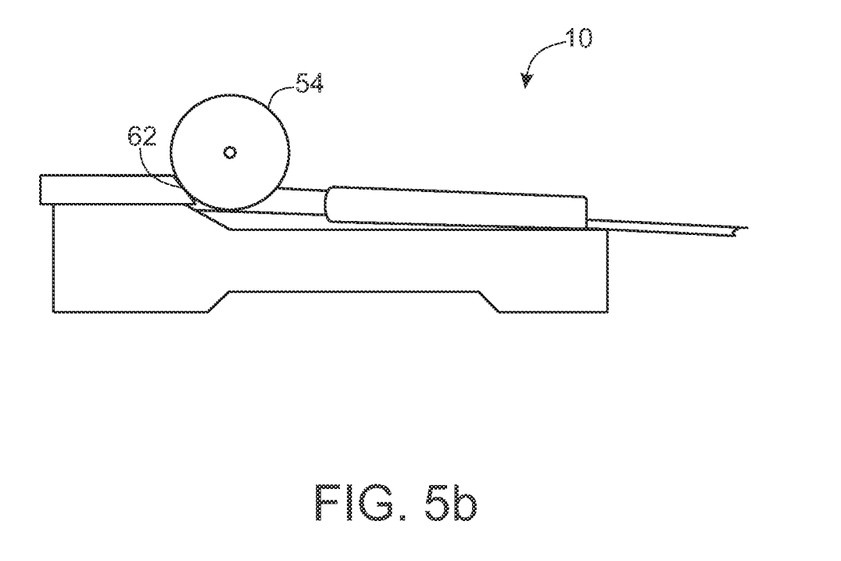
FIG. 5b is a side perspective of an embodiment of the invention with a fly casting reel attached.

As shown in FIG. 5, in a preferred embodiment, the side supports 20 can have indents 64 which facilitate gripping and carrying the rack. Additionally, the indent 64 forms feet 66 which provide a secure surface on which to stand the rack 10.

As shown in FIG. 2, in a preferred embodiment, the top crossbar 30 has a carrying strap opening 38 with a carrying strap 39 threaded through it.

Figure 6:
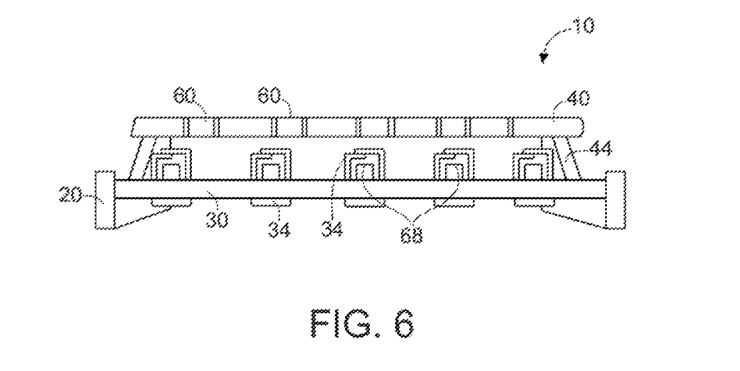
FIG. 6 is a top perspective of an embodiment of the invention.
Figure 7:
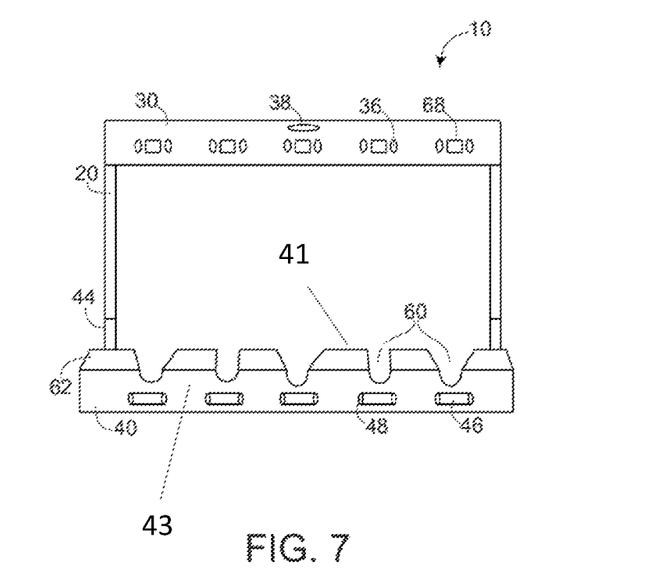
FIG. 7 is a front perspective of an embodiment of the invention.
Figure 8:
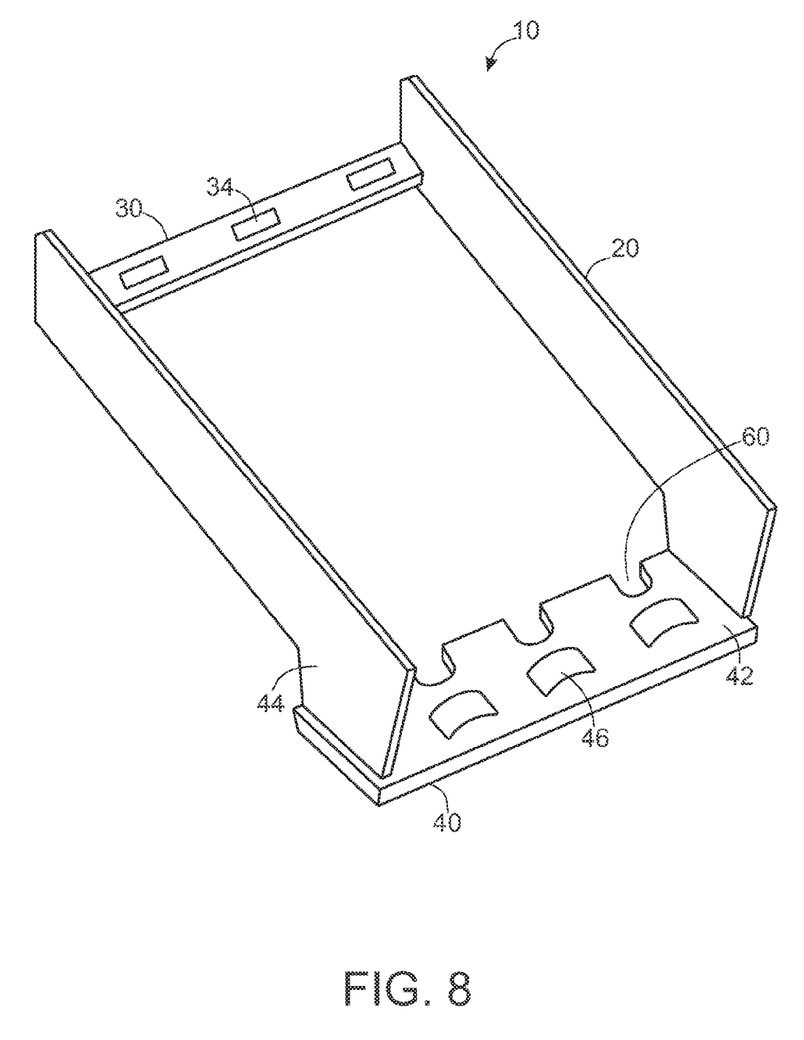
FIG. 8 is a back raised perspective of an embodiment of the invention.

As shown in FIGS. 6, 7 and 8, in a preferred embodiment, the bottom crossbar has at least one notch 60 on the top edge 41. The reel 54 can nest on the front surface of the bottom crossbar 43. The notch helps secure the rod and reel to the rack 10. The notch 60 can be rectangular or U-shaped. In a more preferred embodiment, the notch can be "V"-shaped and have a wider portion and a narrower portion to facilitate the gripping of the reel in the narrowing surface of the notch. Preferably, the notch is from about ½ to 2 inches wide, and from about ½ to 2 inches deep. In a more preferred embodiment, the notch is from about ⅜ to 1½ inches wide and from about 1 to 2 inches deep.

In FIGS. 7, 5a and 5b is the bottom crossbar bevel 62 which provides an engaging surface which is effective for attaching the reel 54 of a fly fishing, bait casting or spin casting rod and reel. The dimensions of the reel prevent the insertion of the reel into the notch, so the reel is engaged with the rack on the surface of the bevel 62. Preferably, the bevel is about 45 degrees from horizontal, and is from about ½ to ¾ inches long.

As shown in FIGS. 6 and 7, in a preferred embodiment, spacers 68 are fastened to the top crossbar, aligned with the releaseable fastener 34. The spacer 68 helps with the alignment of the rod 50 and facilitates better fastening to the rack 10, so that the rod is not loose and moving when transported in the rack 10. Preferred spacers 68 act as a dampener for motion between the rod and the top crossbar. A preferred size is about 1 inch long by ½ inch wide by ⅜ inch deep. A most preferred material for the space is rubber that has adhesive applied to one surface to attach the rubber material to the top crossbar. In another embodiment, in place of the spacers 68 are grooves between the releasable fastener openings 36 in the top crossbar to provide a place for the rod to nest and be held securely in place.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A rack for storing and carrying at least one rod and reel, the rod having a handle and a support arm, consisting of two parallel side supports and a top crossbar and a bottom crossbar attached fixedly to the two parallel side supports, wherein the rack has a front and a back, wherein the top crossbar consists of a front surface, wherein the bottom crossbar which has a bottom crossbar back surface and a bottom crossbar front surface, and wherein the side supports have an offset which places the back surface of the bottom crossbar forward from the front surface of the top crossbar by from about 0.25 to 2.0 inches; wherein the bottom crossbar has a top edge; wherein the bottom crossbar has notches on the top edge; wherein the support arm of the handle and the reel nest in the notch; wherein the back surface of the bottom crossbar releasably engages with the handle of the rod; wherein the reel is positioned in front of the bottom crossbar front surface; and wherein the front surface of the top crossbar releasably engages with the rod.

2. The rack of claim 1, wherein the notches are selected from the group consisting of "U"-shaped, "V"-shaped and rectangular-shaped notches.

3. The rack of claim 2, wherein the bottom crossbar has a bevel providing an engagement surface.

4. The rack of claim 3, wherein the top crossbar has releasable fastener openings with spacers.

5. The rack of claim 4, wherein releasable fasteners are threaded through the releasable fastener openings and are selected from the group consisting of hook and loop fasteners and bungee cord fasteners.

6. A rack for storing and carrying at least one rod and reel, the rod having a handle and a support arm, consisting of two parallel side supports and a top crossbar and a bottom crossbar attached fixedly to the two parallel side supports, wherein the rack has a front and a back, wherein the top crossbar consists of a front surface, wherein the bottom crossbar which has a bottom crossbar back surface and a bottom crossbar front surface, and wherein the side supports have an offset which places the back surface of the bottom crossbar forward from the front surface of the top crossbar by from about 0.25 to 2.0 inches; wherein the bottom crossbar has a top edge; wherein the bottom crossbar has notches on the top edge; wherein the support arm of the handle and the reel nest in the notch; wherein the back surface of the bottom crossbar releasably engages with the handle of the rod; wherein the reel is positioned in front of the bottom crossbar front surface; wherein the top crossbar has spacers on the front surface of the top crossbar, and wherein the front surface of the top crossbar releasably engages with the rod.

7. The rack of claim 6, wherein the notches are selected from the group consisting of "U"-shaped, "V"-shaped and rectangular-shaped notches.

8. The rack of claim 7, wherein the top crossbar has releasable fastener openings with releasable fasteners threaded through them.

9. The rack of claim 8, wherein the fasteners are selected from the group consisting of hook and loop fasteners and bungee cord fasteners.

10. The rack of claim 9, wherein the bottom crossbar has bottom crossbar releasable fastener openings with bottom crossbar releasable fasteners threaded through them.

11. The rack of claim 10, wherein the bottom crossbar releasable fasteners are selected from the group consisting of hook and loop fasteners and bungee cord fasteners.

12. The rack of claim 11, wherein the bottom crossbar releasable fasteners for the bottom crossbar are bungee cords, and wherein there are three fastener openings per bottom crossbar releasable fastener.

13. A rack for storing and carrying at least one rod and reel; the rod having a handle and a support arm, consisting of two parallel side supports and a top crossbar and a bottom crossbar attached fixedly to the two parallel side supports, wherein the rack has a front and a back, wherein the top crossbar consists of a front surface, wherein the bottom crossbar which has a bottom crossbar back surface and a bottom crossbar front surface, and wherein the side supports have an offset which places the back surface of the bottom crossbar forward from the front surface of the top crossbar by from about 0.25 to 2.0 inches; wherein the bottom crossbar has a top edge; wherein the bottom crossbar has notches on the top edge; wherein the support arm of the handle and the reel nest in the notch; wherein the back surface of the bottom crossbar releasably engages with the handle of the rod; wherein the reel is positioned in front of the bottom crossbar front surface; wherein the top crossbar has spacers on the front surface of the top crossbar, wherein the front surface of the top crossbar releasably engages with the rod; and wherein the notches are selected from the group consisting of "U"-shaped, "V"-shaped and rectangular-shaped notches.

14. The rack of claim 13, wherein there is a carrying strap attached to the top crossbar.

15. The rack of claim 14, wherein the side supports have indents.

16. The rack of claim 15, wherein the offset has a bevel.

17. The rack of claim 16, wherein rack is made by injection molding.

18. The rack of claim 17, wherein the rack carries three rod and reels.

19. The rack of claim 16, wherein the rack carries five rod and reels.

* * * * *